United States Patent [19]

Barone

[11] Patent Number: 4,808,311
[45] Date of Patent: Feb. 28, 1989

[54] CRYSTAL GROWTH PROCESS FOR PREPARING INORGANIC DYNAMIC MEMBRANES

[75] Inventor: Joseph P. Barone, Westford, Mass.

[73] Assignee: Millipore Corporation, Bedford, Mass.

[21] Appl. No.: 926,927

[22] Filed: Nov. 3, 1986

[51] Int. Cl.$^4$ ............................................. B01D 13/00
[52] U.S. Cl. ................................ 210/490; 210/500.25
[58] Field of Search .................. 428/699, 704; 55/158; 210/490, 500.25, 506; 204/295

[56] References Cited

U.S. PATENT DOCUMENTS

| | | | |
|---|---|---|---|
| 3,331,772 | 7/1967 | Brownscombe et al. | 210/500 X |
| 3,413,219 | 11/1968 | Kraus et al. | 210/23 |
| 3,926,799 | 12/1975 | Thomas et al. | 210/500 X |
| 4,077,885 | 3/1978 | van Heaven et al. | 210/500 X |
| 4,196,070 | 4/1980 | Chao et al. | 264/49 X |
| 4,446,024 | 5/1984 | Baker et al. | 210/500.21 |
| 4,689,150 | 8/1987 | Abe et al. | 210/500.26 |

FOREIGN PATENT DOCUMENTS

| | | |
|---|---|---|
| 1140003 | 1/1983 | Canada. |
| 2502508 | 10/1982 | France. |
| WO83/02905 | 9/1983 | World Intl. Prop. O.. |

Primary Examiner—Frank Spear
Attorney, Agent, or Firm—Andrew T. Karnakis; Paul J. Cook

[57] ABSTRACT

Composite inorganic microporous or ultrafiltration membranes are formed by depositing a film of inorganic particles on a porous inorganic substrate. In a second step, the particles comprising the film are bonded or joined together by passing a supersaturated solution of the particle composition through the particle film, thereby to effect crystal growth on the particles, and to fine tune the film pore size. The entire process is conducted at low temperatures, generally less than 90° C.

5 Claims, 2 Drawing Sheets

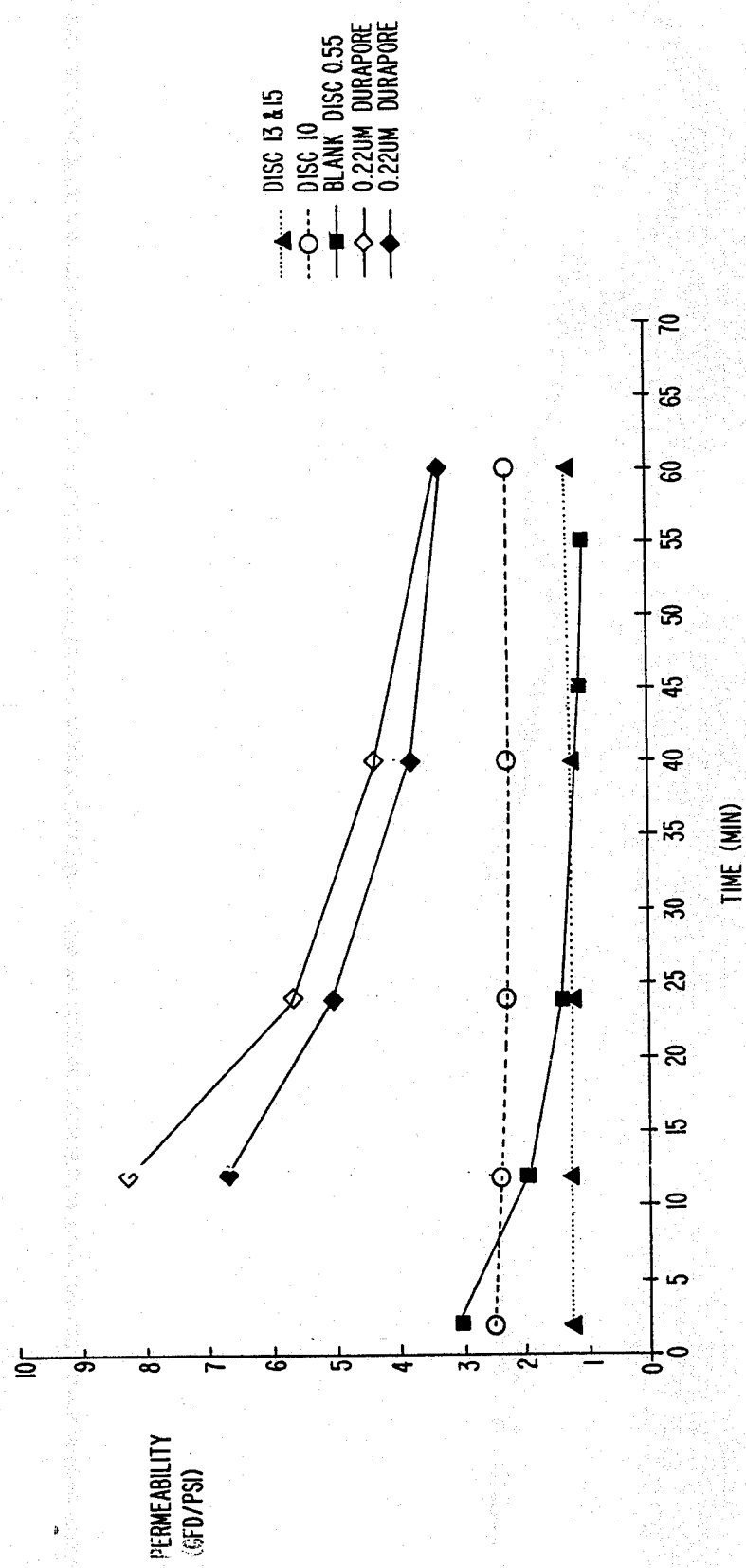

CRYSTAL GROWTH PROCESS FOR PREPARING INORGANIC DYNAMIC MEMBRANES

BACKGROUND OF THE INVENTION

This invention relates to inorganic microporous or ultrafiltration membranes and to a process for preparing such membranes.

Prior to the present invention, two basic processes have been available for the preparation of inorganic membranes. In both processes, insoluble inorganic particles are first deposited from a slurry onto a porous inorganic substrate. A layer or film of particles is formed on the substrate surface. The film is a porous structure resulting from the spaces between the film particles. Bilayers of different sized inorganic particles can also be used to form the film on a coarse substrate. The first bilayer comprises relatively large particles while the second layer comprises smaller particles that are too small to be deposited directly on the coarse substrate.

In one process, after the particles have been deposited on the substrate, the particles are first dried and then bonded to each other and to the substrate by sintering. During sintering, the film of particles are fused together, and may also become fused to the substrate, by partial melting that occurs at the high sintering temperatures that are generally between about 400° C. and 2,000° C. depending upon the particles being deposited. This process is disclosed, for instance, in U.S. Pat. No. 3,926,799. In practice, organic additives are added to the inorganic film before the drying step. The function of the organic additive is to bind the inorganic film particles together during drying. When an organic additive is not utilized, cracking of the inorganic film occurs during drying which results in an unacceptable membrane. The organic additive is evaporated or decomposed during the sintering step.

Examples of utilizing organic binding chemicals are disclosed in Canadian Pat. No. 1,140,003 and French Pat. No. 2,502,508.

In a second process, no further treatment is effected after the particles have been deposited on the substrate. The film particles are held together by relatively weak forces such Van der Waals, or hydrogen bonding. These films generally cannot be dried without cracking. Accordingly, they are always maintained wet. They are less able to withstand chemicals such as acids, bases, salts and solvents as compared to the membranes produced by the above-described first process. Examples of this second process are disclosed in U.S. Pat. Nos. 3,331,772; 3,413,219 and 4,077,885.

It would be desirable to provide inorganic ultrafiltration or microporous membranes capable of being dried without cracking and capable of withstanding acids, bases, salts and solvents commonly encountered in filtration processes. Furthermore, it would be desirable to provide such an inorganic membrane which does not require a high temperature sintering process and therefore does not require matching of film substrate materials having similar thermal expansion coefficients. This would permit producing membranes from a wider range of materials as compared to current processes. Furthermore, it would be desirable to provide such a process which eliminates the need for organic additives.

SUMMARY OF THE INVENTION

This invention provides a process for preparing inorganic microporous and ultrafiltration membranes whereby, in a first step, a thin film of inorganic particles is deposited on an inorganic porous substrate. Subsequently, a supersaturated solution containing a dissolved composition, which is the same composition as the deposited particles, is passed through the thin particle film and the substrate. During passage through the thin particle film and substrate, crystal growth on the particles is effected thereby increasing the thickness of the thin film while decreasing its pore size, and causing the particles to become bonded or bridged thereby forming an integral film.

BRIEF DESCRIPTION OF DRAWINGS

FIG. 3 shows the permeability as a function of the time for various membranes including membranes of this invention.

DESCRIPTION OF SPECIFIC EMBODIMENTS

Figure 1:
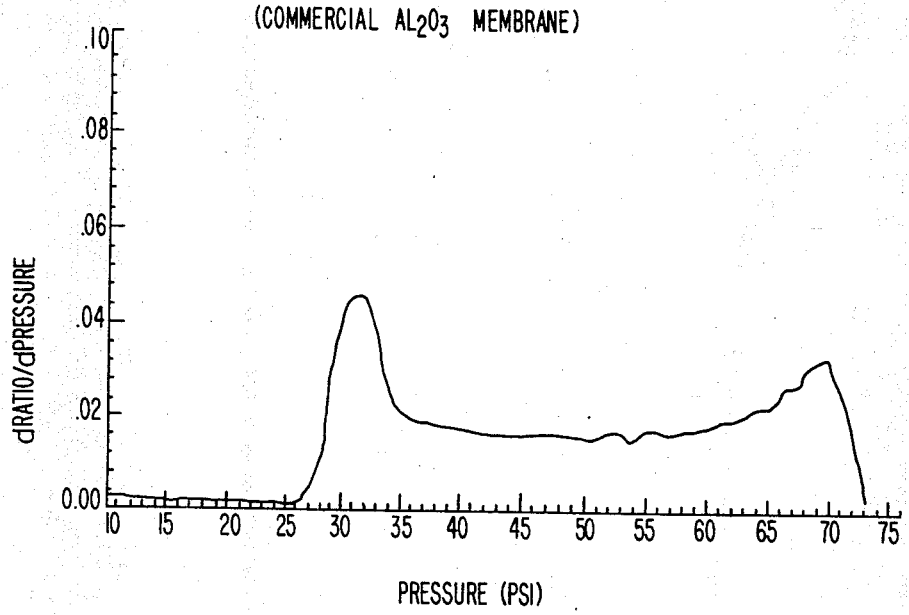
FIG. 1 shows the porosity of a commercially available aluminum oxide membrane.
Figure 2:
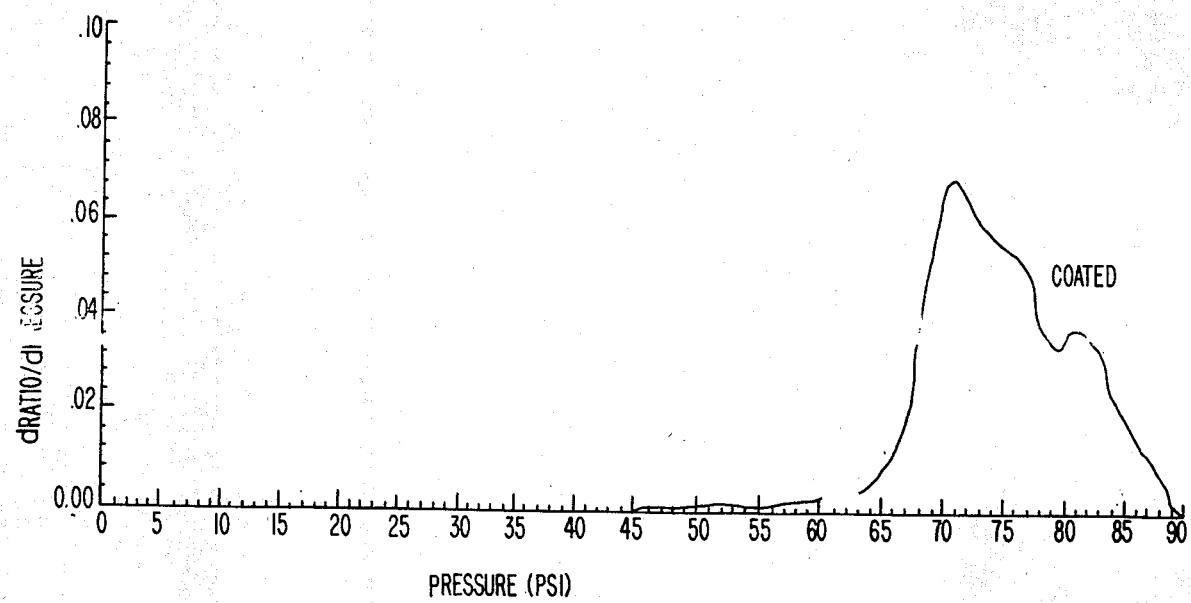
FIG. 2 shows the porosity of a membrane of this invention made with barium sulphate.

The membrane of this invention comprises a microporous substrate and an inorganic coating bound to the substrate. The membrane is resistant to cracks, even when dry, has good mechanical and chemical stability and is resistant to solvents, acids and bases. In addition, the membranes of this invention can be formed at low temperature from a wide variety of inorganic coatings which permit their use in filtration of a wide variety of liquid compositions.

In accordance with this invention, a microporous or ultrafiltration membrane is formed by first depositing a thin film of inorganic particles on an inorganic porous substrate. In a second step, the inorganic particles are joined or bonded together by crystal growth to form a cohesive porous thin film bound to the porous substrate.

The inorganic particles are deposited most conveniently from a liquid slurry containing the particles by contacting the slurry with the porous substrate under pressure so that the liquid portion of the slurry passes through the inorganic substrate leaving the thin film of particles deposited on a surface of the substrate. The ultimate pore size of the film is controlled by the size of the particles deposited on the inorganic substrate. The size distribution of the pores in the deposited film of particles is controlled by controlling the uniformity of the size of the particle being deposited. When the size of the particles is more uniform, the distribution of the size of the pores in the deposited film of particles is correspondingly reduced. For microporous membranes, the average pore size of deposited particles should be about 0.05 and 50 microns, preferably about 0.1 and about 10 microns. As a guide in determining the pore size of the initial film of particles deposited on the substrate, the minimum pore size obtainable on a packed bed of monosized spherical particles is about ⅓ the diameter of the deposited particles. The film of the deposited particles is maintained wet so the particles are held together by weak Van der Waals, or hydrogen bonding forces. At this stage of development it is desirable to avoid drying of this film, since it is difficult to dry the films without cracking.

The inorganic particles are deposited on the inorganic substrate surface from a slurry in a uniform thin film having a relatively high permeability. The particle size and density of the film controls its permeability; the smaller the particles and higher the density the lower the film porosity and the lower the film permeability. The density of the film can be at least partially controlled by controlling the concentration of the particles and ionic strength (IS) in the particle slurry. The more dilute the particle concentration and the lower the IS, generally the more dense the film deposited on the inorganic substrate. It is believed that this is due primarily to the low amount of particle agglomeration accompanying the decrease in ionic strength with increased dilution as well as the ability of a dilute slurry to distribute more easily to regions of high local flux. Generally, the concentration of particles in the slurry ranges between about 0.01 and about 5 g/l, preferably between about 0.05 and about 0.25 g/l. The thin film of particles is deposited for a period of time such that a uniform film is produced such that the porosity of the film-substrate composite is controlled by the film rather than by the substrate. The requisite time for the film deposition can be monitored by measuring the bubble point of the particle film and continuing the deposition of particles until the bubble point approaches a constant value. The bubble point (BP) can be measured by the following procedure:

After film deposition air pressure is applied incrementally to the film, which is wetted with the deposition liquid (typically water), until a flow of air is detected by means of a flow meter. Until the BP pressure is reached no air flow occurs.

Generally, it is not advantageous to increase the thickness of the particle film after the bubble point has approached an essentially constant value since the flux capability of the membrane will be reduced without materially changing the selectivity of the membrane. Generally, particle films should be about 0.1 and about 50 microns preferably between 0.5 and 20 microns thick.

Subsequent to forming the film of particles the film is converted into a stable integrated film by having the particles become joined together by crystal growth. Crystal growth is initiated by passage of a metastable supersaturated solution through the film/substrate composite wherein the dissolved species has the same composition as the particle film. The degree of crystal growth is monitored by measuring the flux of the metastable growth solution through the film. It is desirable to effect only a relatively modest amount of growth so that the flux decrease caused by the crystal growth is not excessive. It is desired that the crystal growth be sufficient to fine tune the pore size in the film and bond the particles together into an integral film without adversely affecting the flux capacity of the resultant membrane. The rate of crystal growth is a function of ionic strength of the supersaturated solution, concentration of the composition to be crystal grown, and the temperature of the solution. At high ionic strength solution, the composition to be crystal grown is generally more soluble and more rapid crystal growth results.

The influence of the growth process on film flux is controlled by the rate of two competing processes; particle agglomeration in the film which results in film disruption and increased flux; and particle growth which results in film integrity and decreased flux. The ionic strength has a pronounced effect on the agglomeration process and final film uniformity and density. At low ionic strength a slow aagglomeration process typically occurs. Slow particle agglomeration initially dominates over the growth process resulting in an increased flux for a period of time. The rate of particle growth then dominates as the agglomeration process nears completion, resulting in a decrease in flux with time as the film pore size and porosity are reduced by crystal growth.

When utilizing high ionic strength solutions, the initial membrane flux after deposition of the particles is appreciably higher than when utilizing low ionic strength solutions. In addition, there is only a gradual decrease in flux which accompanies crystal growth at excessive ionic concentrations. Undesirable disruption occurs in the film very rapidly after deposition and subsequent contact with the supersaturated growth solution, and results in some poorly coated regions within the film. Accordingly, the ionic strength for the growth solution should generally be about 0.001 and about 0.5M, preferably between about 0.01 and about 0.05M in order to assure general uniform crystal growth while minimizing or eliminating disruption of the film. The ionic strength of the crystal growth solution can be varied by adding thereto inert electrolyte such as NaCl, KCl or $NH_4NO_3$.

The crystal growth step can be conducted at a temperature less than above a temperature at which spontaneous nucleation occurs in the supersaturated solution prior to effecting crystal growth within the particle film. Accordingly, the concentration of the crystal growth composition in the solution is such as to form a metastable supersaturated solution without effecting the premature precipitation of the composition prior to crystal growth on the film of particles. The exact concentration of the crystal growth composition will vary depending upon the crystal growth composition and the liquid medium forming the solution. Any liquid medium can be utilized so long as it is capable of dissolving the crystal growth composition and for permitting subsequent crystal growth when the supersaturated solution contacts the particle film. Representative suitable liquids include water, methanol, ethanol, acetone, with water being preferred. When the liquid is water, crystal growth is conducted at a temperature less than 100° C., preferably between about 40° C. and 70° C.

Representative suitable inorganic substrates for forming the membranes of this invention include ceramics such as cordierite, mullite and aluminum oxide or metals such as stainless steel, nickel and titanium or carbon. Any inorganic substrate can be used so long as it has the porosity desired and is capable of accepting a film of particles and mechanically binding to the film upon completion of the crystal growth step. Generally the inorganic substrate has pores of a size between about 0.05 and 50 microns, preferably between about 0.2 and 10 microns. Representative suitable particle films include those of low solubility formed from particles such as barium sulphate, copper sulfide, bismuth sulfide and aluminium hydroxide. Any inorganic particles can be utilized so long as they form a film having a desired porosity and can be bonded together by means of the crystal growth step. The inorganic particles have generally a size between about 0.01 and 50 microns, preferably between about 0.05 and 10 microns. The particle film, after being subjected to the crystal growth step, is characterized by a relatively rough particle surface in which crystal facets extending from the particle surfaces are evident. In contrast, a particle film which has been sintered is characterized by relatively smooth surfaces caused by a melting of the particle surfaces and subsequent solidification by cooling.

The following example illustrates the present invention and is not intended to limit the same.

EXAMPLE I

This example illustrates the preparation of an inorganic membrane having a porous cordierite substrate and a porous $BaSO_4$ surface film.

The $BaSO_4$ process for preparing microporous films on a cordierite substrate consists of three steps:

(1) Preparation of monosized $BaSO_4$ particles—the size of these particles dictates the ultimate film pore size.

(2) Deposition of a uniform, densely-packed layer of these $BaSO_4$ particles on the substrate surface to form the membrane.

(3) Crystal growth of the $BaSO_4$ particles for bonding the particles together and to the substrate, and to fine tune the film pore size.

Preparation of monosized, spherical $BaSO_4$ particles

A spontaneous nucleation technique was used to make the $BaSO_4$ particles. A 0.01M $(NH_4)_2SO_4$ solution is rapidly added to an equal volume of a 0.01M $BaCl_2$ solution containing $Na_3$ citrate. All solutions are prefiltered through 0.1 um filters before mixing. The reaction is conducted at room temperature. A variety of monosized, spherical particles can be made, depending on the concentration of $Na_3$ citrate, as detailed below:

| [$Na_3$ Cit]* (M) | Time for Precipitation to Begin (min) | Size Particles + (diameter, um) | Shape Factor± |
|---|---|---|---|
| 0.010 | 0.1–0.2 | 1.02 ± 0.05 | — |
| 0.020 | 8.0–12.0 | 0.40 ± 0.05 | 1.19 |
| 0.040 | about 40.0 | 0.30 ± 0.05 | 1.45 |
| 0.053 | about 60.0 | 0.18 ± 0.05 | 1.37 |

*in the 0.01 M $BaCl_2$ solution
+from SEM particle size analysis. For sphere shape factor = 1.00

The particles are very monodispersed and spherical in shape. Any size in the range of about 0.18 to 1.2 um can be prepared by varying the $Na_3$ Citrate concentration.

Preparation of Metastable Supersaturated $BaSO_4$ Solutions

Metastable supersaturated $BaSO_4$ solutions used as the growth solutions are prepared by slowly (drop-by-drop) adding a soluble barium salt solution to a stirred soluble sulfate salt solution containing an inert electrolyte at room temperature. The inert salt's function is to increase the solubility of $BaSO_4$, maximizing the rate of crystal growth. A high (0.5M) and low (0.01 to 0.02M) inert salt solution ($NH_4NO_3$) were used. For high salt solution 45 ml of $8 \times 10^{-3}$M $(NH_4)_2SO_4$ solution was slowly added (10 min) to 955 ml of a $3.8 \times 10^{-4}$M $BaCl_2$ solution containing 0.53M $NH_4NO_3$. One liter of 3.6 $10^{-4}$M $(NH_4)_2SO_4$ and $3.6 \times 10^{-4}$M $BaCl_2$ (or $3.6 \times 10^{-4}$M $BaSO_4$) in 0.5M $NH_4NO_3$ resulted. Each of the above solutions were first filtered through 0.22 um GS membrane before mixing. After mixing the supersaturated solution was filtered through PTGC membrane (10,000 MW cutoff) in a Pellicon cassette. This solution is stable to $BaSO_4$ spontaneous precipitation for at least 24 hrs.

Similarly for the low salt solution 12.5 ml of $8 \times 10^{-3}$M $(NH_4)_2SO_4$ was added to 494 ml of $2.05 \times 10^{-4}$M $BaCl_2$ containing 0.0205M $NH_4NO_3$; resulting in 500 ml of $2 \times 10^{-4}$M $BaSO_4$ in 0.02M $NH_4NO_3$. This solution is also stable for at least 24 hrs. after PTGC filtration.

Rate of Crystal Growth for $BaSO_4$

The rate of crystal growth around a given mass of $BaSO_4$ particles is given by (in solutions of equal concentrations of $Ba^{+2}$ and $SO_4$)

$$\text{Rate (mass/time)} = K(T)(Ba_{,s} - Ba_{,o})^2$$

where $K(T)$ = rate constant dependent on temperature, T
$Ba_{,s}$ = concentration of Ba in supersaturated solution
$Ba_{,o}$ = concentration of Ba at saturation (depends on inert salt or ionic strength concentration and temperature)

At the same temperature the ratio of the rate of growth in 0.5M $NH_4NO_3$ (where $Ba = 3.6 \times 10^{-4}$M and $Ba_{,o} = 7 \times 10^{-5}$M) to that in 0.02M $NH_4NO_3$ (where $Ba = 2 \times 10^{-4}$M and $Ba_{,o} = 2 \times 10^{-5}$M) is, $$\frac{\text{growth rate 0.5 M } NH_4NO_3}{\text{growth rate 0.02 M } NH_4NO_3} = \frac{[(3.6)(10^{-4}) - (7)(10^{-5})]^2}{[(2.0)(10^{-4}) - (2)(10^{-5})]^2} = 2.6$$

This clearly shows why crystal growth is more desirable in a high salt solution—where the rate of growth is much greater than in low salt medium.

Particle Deposition

The $BaSO_4$ particles were admixed with water and stirred to form $BaSO_4$ slurry of concentration about 0.03 to 0.06 g/l. The slurry then was filtered through porous cordierite substrates so that the $BaSO_4$ particles deposited on the cordierite surface at a thickness of about 4 to 6 microns. The resultant membrane is maintained wet until being processed in the crystal growth step.

A method was developed to measure the bubble point (BP) of the $BaSO_4$ film on the disc surface to monitor film density and uniformity during the particle deposition step. Particles were deposited from both a concentrated and dilute slurry, in aliquots each resulting in a film thickness of 4 um if evenly distributed. The BP was measured after each application, and applications were made until the BP approached a constant value. The film deposited from the dilute slurry approached a constant BP faster than that made from the concentrated slurry, (when 4 microns thick rather than 12 microns). Scanning electron microphotographs (SEM) further support this view, clearly showing a more uniform film for the dilute case. This indicates that a denser more uniform film is created using the more dilute slurry.

Crystal Growth

After uniform deposition, crystal growth is initiated by passage of metastable supersaturated $BaSO_4$ solution through the film/substrae unit. This solution contains $NH_4NO_3$ to determine ionic strength. The influence of the growth process on the film is monitored by measuring the flux of the metastable growth solution through the film.

The rate of growth is a function of ionic strength, concentration, and temperature, each of which were investigated in this study. The influence of the growth process on film flux was found to be controlled by the rate of two competing processes; particle agglomeration in the film layer (resulting in film disruption and increased flux) and particle growth (resulting in decreased flux). Crystal growth is influenced by solution ionic strength; at high ionic strength $BaSO_4$ is more soluble and crystal growth is more rapid.

At low ionic strength a slow agglomeration process typically occurs in the film. Here slow particle agglomeration initially dominates over crystal growth resulting in an increased flux during crystal growth until about 90 minutes into the growth process. The rate of particle growth then dominates, as the agglomeration process nears completion, resulting in a decrease in flux with time as the film pore size and porosity are reduced by crystal growth, FIG. 3.

A different flux pattern is observed for the high ionic strength solution. First, the initial flux after deposition at time zero (before crystal growth) is appreciably higher (8 GFD/psi) than for the low ionic strength case (5 GFD/psi). Second, there is little if any increase in flux vs. growth time, only a gradual decrease accompanying crystal growth. At high ionic strength the particle double layer is collapsed almost immediately, resulting in rapid particle agglomeration and film disruption. This disruption results in some poorly-coated regions within the film, high local porosity, and relatively high flux.

The differences in flux vs. time for high and low ionic strength cases can be explained by the rapid disruption of the film when subjected to the high ionic strength crystal growth solution, compared to the slow disruption from the low ionic strength solution case. Moreover, light microscopic analysis of the films grown at high ionic strength clearly show some areas that are poorly coated. This is not as common in the films grown at low ionic strength where a much more uniform film develops. Evidently, the slow film disruption for the low ionic strength case does not result in macroscopic film disruption, but only slight particle rearrangements, which does result in increased film porosity, however.

The results set forth below indicate that crystal growth is best conducted at low ionic strength where less film disruption occurs. Since the rate of crystal growth in the low ionic strength (IS) solution (0.02M) is about 2.5 fold slower than in the higher IS (0.5M) films grown at low IS would take longer to prepare. To compensate for this, growth was conducted at higher temperature (about 50° to 60° C.) where the rate constants for both the growth and agglomeration processes are greater. The net effect of these two competing processes at elevated vs. room temperature was not studied in sufficient detail such that meaningful conclusions could be drawn. Based on theoretical considerations crystal growth rate constants generally increase as an exponential function of temperature, while those for agglomerate are only directly proportionally to temperature. Therefore, it is expected that the net effect of growth at elevated temperature should accelerate film development.

Low Ionic Strength Case (0.02M $NH_4NO_3$)

On going from point A to point B in FIG. 3 the permeability increases from 4.2 to 7.2 GFD/psi, or a 71% increase. This is equivalent to an increase in porosity from 0.41 to 0.55, or a 34% increase. Thus, relatively modest increases in porosity (resulting from slow particle agglomeration) results in much greater relative increases in film flux. After 90 minutes, the agglomeration process is evidently near completion, and crystal growth then dominates. This results in the decrease in porosity from 0.55 to 0.51 (Point B to Point C in FIG. 3).

| High Ionic Strength Case (0.5 M $NH_4NO_3$) | | | | |
|---|---|---|---|---|
| Graph Symbol | Time (min) | Total Resistance (cm$^{-1}$) | Porosity (E) | Film Thickness (um) |
| D | 0 | $1.7 \times 10^{10}$ | 0.56 | 5.4 |
| E | 185 | $2.2 \times 10^{10}$ | 0.53 | 7.2 |

Here the porosity decreases slightly from its value after deposition, 0.56, to that at the end of the growth period, 0.53, due to particle crystal growth.

Note that the initial porosity after deposition for the concentrated case 0.56 (pt D) is much higher than that for the dilute case 0.41 (pt A). This arises due to the very rapid agglomeration that occurs in the high salt case vs. the slow agglomeration in the low salt case.

Thickness of Film of Particles in Packed Bed

The thickness of a bed of particles of porosity, E, is given by:

$$h = M/A\, p\, (1-E)$$

Where
h = thickness
A = area over which particles are deposited
p = density of pure solid particles
M = mass of deposited particles
E = film porosity
E is determined as shown below, A and M are experimentally measured, while p is a constant (4.5 g/cm$^3$, $BaSO_4$).

After crystal growth of spherical particles, that grow uniformly, the size of a single crystal increases by $(M/M_o)^{\frac{1}{3}}$, where M = particle mass after growth and $M_o$ = particle mass before growth. Thus, the thickness of the entire bed of particles after growth is, $$h = \frac{h_o(1 - E_o)(M/M_o)^{\frac{1}{3}}}{(1 - E)}$$

where the subscript o refers to the initial case (before growth).

Pore size Distribution

The five $BaSO_4$ films made using the low ionic strength crystal growth solutions were air dried, then characterized for pore size distribution by air porosimetry (using methanol as the wetting liquid, surface tension 22.6 dynes/cm, contact angle 0°). The uncoated cordierite discs had a mean BP of 39±2 psi and a distribution of BP's from 15 to 48 psi. This corresponds to an average pore size of 0.34 micron, with size range of 0.38 to 0.88 micron.

After $BaSO_4$ deposition and crystal growth the mean BP's are 73±13 psi and the distribution of BP's ranged from 62 to 90 psi. The average pore size for the $BaSO_4$ films is calculated to be 0.18 micron with size range of 0.15 to 0.21 micron.

Similarly the three BaSO$_4$ discs made using the high ionic strength growth solution gave an average BP of 63±11 psi, corresponding to an average size of 0.21 micron with size range of 0.18 to 0.25 micron. Light microscopic examination shows some poorly-coated areas on these discs, in line with the lower BP values vs. the low ionic strength discs.

Film Thickness/Integrity

The initial BaSO$_4$ film thickness is 4-6 um as estimated from the known amount of BaSO$_4$ initially deposited. The increase in BaSO$_4$ particle mass during crystal growth increases the film thickness 1-3 um, resulting a final thickness of 5 to 9 micron. This calculated final thickness compares well to that measured from SEM cross-section analysis.

SEM of grown BaSO$_4$ films clearly shows that the particles have intergrown together, forming a well-bonded film. Cross-section analysis shows that the BaSO$_4$ particles follow the surface contours of the ceramic substrate. A small gap is observed, about 0.1 um thick, between the BaSO$_4$ film and substrate. The film is evidently bonded to the ceramic by mechanical interlocking—as paint is bonded to wood or metal.

Film Porosity

Based on the Carman Kozeny equation the porosity is calculated in the bed of spherical BaSO$_4$ particles. For the low ionic strength grown films the initial porosity is about 0.4 (before growth) which increases to about 0.56 at the maximum in the flux vs. growth time plot (FIG. 3, Point B, 90 minutes), then decreases to a final value of 0.5 (at the end of the growth process, Point C).

For the high ionic strength grown films the initial porosity is about 0.56 (FIG. 3, Point D). This is appreciably higher than the initial porosity for the low ionic strength case, 0.4. It results from the rapid particle agglomeration upon contact with a high ionic strength solution. After crystal growth the porosity decrease slightly to 0.53 (Point E).

I claim:

1. A composite membrane comprising a porous inorganic substrate and a integral particle porous filim directly bound only to one surface of said substrate, said particle porous film being bonded together by crystal growth to form a integral film.

2. The composite membrane of claim 1 wherein the average pore size of said porous film is between about 0.05 and 50 microns.

3. The composite membrane of claim 1 wherein the average pore size of said porous film is between about 0.002 and 0.05 microns.

4. The composite membrane of any one of claims 1, 2 or 3 wherein said substrate is cordierite.

5. The composite membrane of any one of claims 1, 2 or 3 wherein said porous film comprises bonded barium sulfate particles.

* * * * *